(12) United States Patent
Mitchell, Jr. et al.

(10) Patent No.: US 10,272,542 B2
(45) Date of Patent: Apr. 30, 2019

(54) ABRASIVE WATER JET BALANCING APPARATUS AND METHOD FOR ROTATING COMPONENTS

(71) Applicant: Balance Technology, Inc., Whitmore Lake, MI (US)

(72) Inventors: Bruce J. Mitchell, Jr., Dexter, MI (US); John Haidler, Pinckney, MI (US); Mbala Robert Mayanga, Ypsilanti, MI (US); Stephen Strinka, Ann Arbor, MI (US)

(73) Assignee: Balance Technology, Inc., Whitmore Lake, MI (US)

( * ) Notice: Subject to any disclaimer, the term of this patent is extended or adjusted under 35 U.S.C. 154(b) by 359 days.

(21) Appl. No.: 15/099,713

(22) Filed: Apr. 15, 2016

(65) Prior Publication Data
US 2016/0325402 A1 Nov. 10, 2016

Related U.S. Application Data (60) Provisional application No. 62/158,596, filed on May 8, 2015.

(51) Int. Cl.
*B24C 1/04* (2006.01)
*B24C 3/32* (2006.01)
(Continued)

(52) U.S. Cl.
CPC .............. *B24C 1/045* (2013.01); *B24C 1/04* (2013.01); *B24C 3/32* (2013.01); *B26F 3/004* (2013.01);
(Continued)

(58) Field of Classification Search
CPC ... B24C 1/04; B24C 1/045; B24C 3/32; B26F 3/004; F01D 5/027; G01M 1/16; G01M 1/34; F05D 2220/40
(Continued)

(56) References Cited

U.S. PATENT DOCUMENTS

| | | |
|---|---|---|
| 3,589,203 A | 6/1971 | Hines |
| 3,608,381 A | 9/1971 | Hines |

(Continued)

FOREIGN PATENT DOCUMENTS

| | | |
|---|---|---|
| DE | 102009021725 A1 | 11/2010 |
| EP | 2535592 A2 | 12/2012 |

(Continued)

OTHER PUBLICATIONS

International Search Report dated Jun. 29, 2016, International Application No. PCT/US2016/027833.

*Primary Examiner* — Eileen Morgan
(74) *Attorney, Agent, or Firm* — Young Basile Hanlon & MacFarlane, P.C.

(57) ABSTRACT

A method, apparatus, and system for correcting unbalance of a turbocharger component relative to an axis of rotation of the turbocharger component. The method includes determining one or more unbalance characteristics for the turbocharger component, determining parameters for a first correction operation to be performed in a first correction plane, and moving the turbocharger component to align a first correction area of the turbocharger component with respect to a first water jet cutter and performing the first correction operation using the first water jet cutter. The method may include determining parameters for a second correction operation to be performed in a second correction plane and moving the turbocharger component to align a second correction area of the turbocharger component with respect to a second water jet cutter and performing the second correction operation using the second water jet cutter.

14 Claims, 7 Drawing Sheets

(51) Int. Cl.
*G01M 1/16* (2006.01)
*G01M 1/34* (2006.01)
*B26F 3/00* (2006.01)
*F01D 5/02* (2006.01)

(52) U.S. Cl.
CPC ............... *F01D 5/027* (2013.01); *G01M 1/16* (2013.01); *G01M 1/34* (2013.01); *F05D 2220/40* (2013.01)

(58) Field of Classification Search
USPC .......................................... 451/38, 39, 40, 75
See application file for complete search history.

(56) References Cited

U.S. PATENT DOCUMENTS

| | | | |
|---|---|---|---|
| 3,611,792 A | 10/1971 | Hines | |
| 3,681,967 A | 8/1972 | Hines et al. | |
| 3,782,201 A | 1/1974 | Fitts | |
| 3,782,202 A | 1/1974 | Anderson et al. | |
| 4,868,762 A | 9/1989 | Grim et al. | |
| 5,355,728 A | 10/1994 | Hartmann, Jr. | |
| 6,067,857 A | 5/2000 | Cooper et al. | |
| 6,079,268 A | 6/2000 | Metzner | |
| 7,419,418 B2 | 9/2008 | Alberts et al. | |
| 8,568,197 B2 | 10/2013 | Voice et al. | |
| 9,181,804 B1 | 11/2015 | Kennedy | |
| 2013/0047394 A1* | 2/2013 | Cretegny | B23P 6/007 29/402.07 |
| 2013/0167359 A1* | 7/2013 | De La Rupelle | B23C 3/18 29/558 |
| 2016/0363134 A1* | 12/2016 | Seike | F01D 5/027 |
| 2017/0009586 A1* | 1/2017 | Maeda | F01D 5/027 |
| 2017/0074103 A1* | 3/2017 | House | F01D 5/027 |

FOREIGN PATENT DOCUMENTS

| | | |
|---|---|---|
| GB | 2349111 A | 10/2000 |
| WO | 2014128927 A1 | 8/2014 |

* cited by examiner

ABRASIVE WATER JET BALANCING APPARATUS AND METHOD FOR ROTATING COMPONENTS

CROSS-REFERENCE TO RELATED APPLICATIONS

This application claims the benefit of U.S. Provisional Application No. 62/158,596, which was filed on May 8, 2015.

BACKGROUND

Rotating components may be unbalanced as manufactured, and balancing techniques are utilized to balance these components to minimize vibrations and enhance component life. The term "unbalanced" means that the center of mass and/or the inertial axes of a rotating object are not aligned with the axis of rotation of the rotating object. Static unbalance can be expressed in terms of the distance of the center of mass of the rotating object from the axis of rotation, and the angular location of the center of mass with respect to the axis of rotation. Dynamic unbalance is present when the axis of mass or inertia of a rotating object does not intersect the shaft axis.

Apparatuses for measuring unbalance are well known, and generally fall into one of two classes: static balancers and dynamic balancers. One known balancing system drives a rotatory element about a fixed axis of rotation. A sensor outputs a signal indicating the rotational position of the rotary element while an unbalance measuring arrangement outputs an unbalance data signal that represents the magnitude of a residual unbalance characteristic of the rotatory element. An unbalance correction operation is performed, such as by removing a specific amount of material from the rotary element at a specific location, where the amount and location of the material to be removed are determined using the position signal and the unbalance data signal. The effect of the balance correction(s) is to move the rotor mass center onto the axis of rotation and/or align the inertial axes with the axis of rotation.

Balancing techniques are applicable to turbocharger components. Turbochargers are forced induction devices for internal combustion engines that utilize pressurized exhaust gas to increase the pressure of intake air. Pressurizing the intake air allows for higher compression by forcing more air and fuel into the cylinders of the engine. This allows for increased power output from the engine as compared to a naturally aspirated engine.

The exhaust gas from the engine is routed to a turbine housing of the turbocharger. A turbine wheel is located inside the turbine housing. The turbine wheel is connected to a shaft, for example, by welding. As the exhaust gas passes through the turbine housing, the exhaust gas causes the turbine wheel to spin. As an example, some turbocharger turbine wheels spin at speeds in excess of 250,000 revolutions per minute.

A compressor wheel is fastened to the shaft at the end opposite to the turbine wheel. The compressor wheel is enclosed in a compressor housing. Rotation of the turbine wheel causes a corresponding rotation of the compressor wheel. As the compressor wheel spins, intake air is drawn into the compressor housing. The intake air is pressurized by the compressor wheel, and is then routed to the engine.

As a result of the high rotational speeds, the rotating components of the turbocharger must be balanced with respect to their axis of rotation. If these components are unbalanced, components of the turbocharger can fail prematurely, and sometimes catastrophically. Balancing of turbocharger components can be performed with mass removal techniques. However, the materials used in turbocharger components, and in turbocharger wheels in particular, are difficult to machine via conventional methods with the precision required to make effective balance corrections.

SUMMARY

One aspect of the disclosed embodiments is a method for correcting unbalance of a turbocharger component relative to an axis of rotation of the turbocharger component. The method includes determining one or more unbalance characteristics for the turbocharger component, determining parameters for a first correction operation to be performed in a first correction plane, and moving the turbocharger component to align the first correction area of the turbocharger component with respect to a first water jet cutter and performing the first correction operation using the first water jet cutter.

In some implementations of the method, the turbocharger component includes a turbine wheel having a rear surface, and the first correction area is located on the rear surface. In some implementations of the method, the first correction operation includes removing material from the rear surface of the turbocharger component by defining a pocket cut in the rear surface using the first water jet cutter.

In some implementations of the method, defining the pocket cut in the rear surface using the first water jet cutter is performed by moving the turbocharger component relative to the first water jet cutter in the first rotational direction and at least a first linear direction along a cutting path at a substantially constant speed with respect to the cutting path. In some implementations of the method defining the pocket cut in the rear surface using the first water jet cutter includes controlling the first water jet cutter to produce a cutting stream that includes water and an abrasive material, and the cutting stream has a substantially constant flow rate for the abrasive material.

In some implementations of the method, the rear surface lies in a plane that extends approximately perpendicular to the axis of rotation.

In some implementations of the method, the method also includes determining parameters for a second correction operation to be performed in a second correction plane; and moving the turbocharger component to align the second correction area of the turbocharger component with respect to a second water jet cutter and performing the second correction operation using the second water jet cutter.

In some implementations of the method, moving the turbocharger component to align the second correction area of the turbocharger component with respect to the second water jet cutter includes movement of the turbocharger component in a first rotational direction around the axis of rotation of the turbocharger component.

In some implementations of the method, the turbocharger component includes a turbine wheel having a nose portion, and the second correction area is located on the nose portion.

In some implementations of the method, the second correction operation includes removing material from the nose portion of the turbocharger component by defining a pocket cut in the nose portion using the second water jet cutter.

In some implementations of the method, the second correction operation includes removing material from the nose portion of the turbocharger component by defining a through cut in the nose portion using the second water jet cutter.

In some implementations of the method, the method also includes submerging the turbocharger component in a cutting tank prior to performing the first correction operation.

In some implementations of the method, the method also includes removing the turbocharger component from the cutting tank subsequent to performing the second correction operation.

Another aspect of the disclosure is a system for measuring and correcting unbalance of a turbocharger component that has an axis of rotation. The system includes an unbalance measurement machine operable to determine an unbalance characteristic of a turbocharger component. The system also includes an unbalance correction machine that has a first water jet cutter that removes material from a first correction area of the turbocharger component to correct the unbalance characteristic with a first cutting stream that is controlled to form a pocket cut in the first correction area.

In some implementations of the system, the first cutting stream includes water and an abrasive material, and the first cutting stream has a substantially constant flow rate for the abrasive material.

In some implementations of the system, the unbalance correction machine includes a part manipulator that is operable to hold the turbocharger component and one or more motion control stages that are operable to move the turbocharger component relative to the first water jet cutter along a cutting path.

In some implementations of the system, the one or more motion control stages cause the turbocharger component to move relative to the first water jet cutter a substantially constant speed with respect to the cutting path.

In some implementations of the system, the unbalance correction machine has a second water jet cutter that removes material from a second correction area of the turbocharger component to correct the unbalance characteristic with a second cutting stream.

In some implementations of the system, the second water jet cutter that is controlled to form at least one of a pocket cut or a through cut in the second correction area.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to a balancing apparatus and method for rotating components including turbocharger components. As will be discussed herein, abrasive water jet machining techniques are utilized to remove material from a turbocharger component in order to correct an unbalance condition of the turbocharger component. Abrasive water jet machining techniques are commonly utilized for gross cutting operations, where fine control over the amount of mass removed during the cutting operation is not required. In contrast to gross cutting operations, the unbalance correction techniques described herein allow for precise mass removal using an abrasive water jet cutter.

Correction operations are described herein that are subtractive in nature, meaning that material is removed from the object being corrected. The correction operations described herein may include a pocket cut or a through cut. The correction operations described herein, such as the correction operations made using a pocket cut may benefit from increased accuracy in the amount of material removed, as surface variations in the part being corrected do not affect the amount of material being removed. This eliminates the need for knowledge of surface variations in the part in order to achieve acceptable residual unbalance in corrected parts.

As used herein, the term "correct" means to reduce or eliminate an unbalance condition, such as by reducing a magnitude of the unbalance condition below a maximum acceptable magnitude.

As used herein, the term "pocket cut" is a cut that extends into an object from the surface of the object to a depth that is less than the thickness of the object at the location of the cut and thus defines a bottom surface within the cut that is depressed relative to the nominal surface of the object, but does not extend completely through the object. As used herein, the term "through cut" refers to a cut that does not define a bottom surface within the cut, but instead extends entirely through the object at the location of the cut. Both pocket cuts and through cuts remove material from the object, and therefore may be used in subtractive correction operations.

Figure 1:
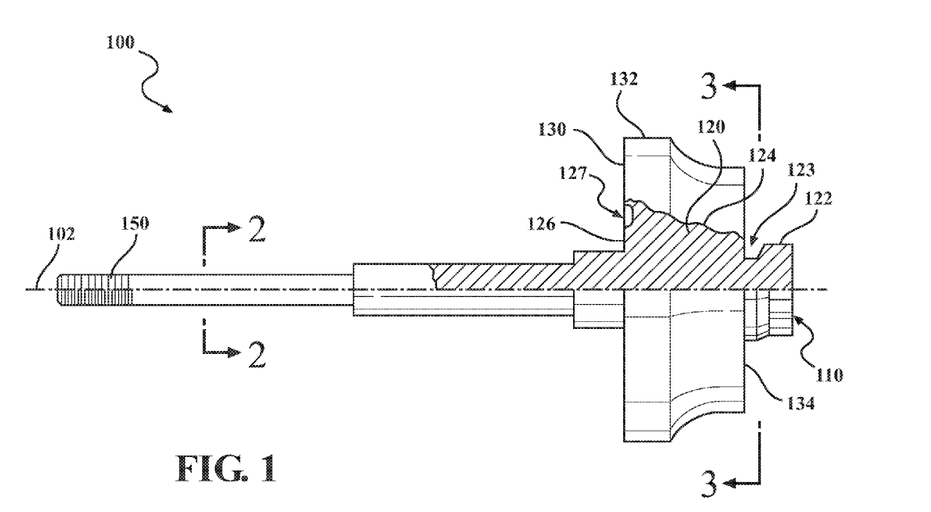
FIG. 1 is a side, partial cross-section view of a turbine wheel and shaft assembly.
Figure 2:
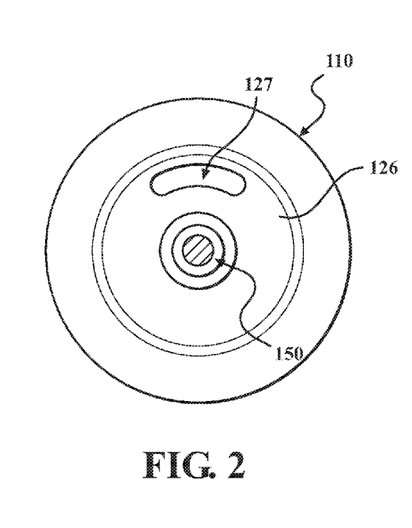
FIG. 2 is a cross-section view of the turbine wheel and shaft assembly taken along line 2-2 of FIG. 1.
Figure 3:
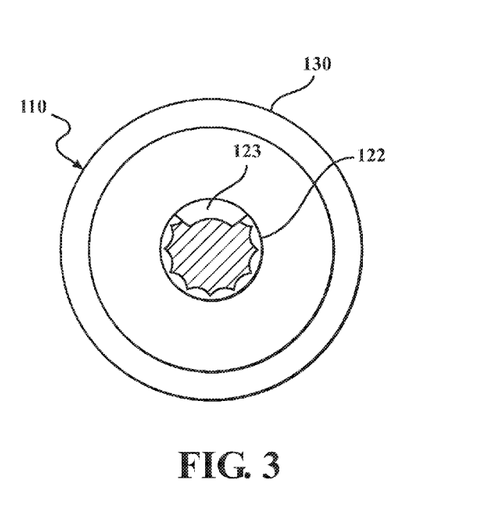
FIG. 3 is a cross-section view of the turbine wheel and shaft assembly taken along line 3-3 of FIG. 1.

As an example of a turbocharger component to which the apparatuses and methods described herein can be applied, FIGS. 1-3 show an assembly 100 that includes a turbine wheel 110 and a shaft 150. The turbine wheel 110 is the portion of the turbocharger that is rotated by the exhaust gases from the internal combustion engine which in turn rotates the shaft 150 and compressor wheel (not shown).

The turbine wheel 110 is conventional, and is arranged around an axis of rotation 102 of the assembly 100. The turbine wheel 110 includes a hub 120 and a plurality of blades 130. The axis of rotation 102 extends centrally through the hub 120. The hub 120 includes a nose portion 122 that is positioned forward from the blades 130, an outer surface 124 to which the blades 130 are attached, and a rear surface 126.

The blades 130 are arrayed radially around the axis of rotation 102 of the assembly 100 and each extend outward from the hub 120. The spaces formed between adjacent ones of the blades 130 allow for passage of the exhaust gas.

The blades 130 each have an inducer portion 132 and an exducer portion 134. The inducer portion 132 is located at the outer periphery of each of the blades 130 at an outside diameter of the turbine wheel 110, and each inducer portion 132 and faces generally outward. The inducer portion 132 is the portion of each blade that draws the exhaust gas radially inward. The exducer portion 134 is located inward from the inducer portion 132 and faces generally forward (i.e. away from the shaft 150).

The rear surface 126 may be generally planar and be aligned with or substantially aligned with a plane that is perpendicular to the axis of rotation 102. The rear surface 126 may be at the rear of a widened profile of the hub 120 or at the rear of a planar ring, such as a fullback ring, that extends outward from the hub 120. The rear surface 126 may have an outside diameter that is equal to the outside diameter of the blades 130, or the rear surface 126 may have an outside diameter that is less than the outside diameter of the blades 130

The shaft 150 is an elongate member that passes through the bearing housing of the turbocharger to connect the turbine wheel 110 to a compressor wheel (not shown). The shaft 150 extends from the rear surface 126 of the hub 120 of the turbine wheel 110. The shaft 150 and the turbine wheel 110 could be formed as an integral unit, but more typically the shaft 150 and the turbine wheel 110 are formed separately and then joined together by a conventional method such as welding or brazing. For example, the shaft 150 could be joined to the turbine wheel 110 by welding at a weld boss (not shown) that is formed on the rear surface 126 of the turbine wheel 110.

Operation of a turbocharger will subject the assembly 100 to very high rotational speeds. Because of this, the assembly 100 must be balanced along the axis of rotation 102 of the assembly 100. When initially manufactured, however, the assembly 100 will not be balanced. An unbalance characteristic of the assembly 100 can be measured using known methods. In particular, an unbalance measuring machine (not shown) can be utilized to determine one or more unbalance characteristics of the assembly 100. Data representing the unbalance characteristics and/or data representing parameters for an unbalance correction operation can be output by the unbalance measuring machine, also using known methods. As one example, the data can include information describing a rotational angle, measured on the axis of rotation 102 relative to a datum, by which the assembly 100 is unbalanced, as well as a magnitude of the unbalance. As another example, the data can represent one or more locations on the assembly 100 at which material is to be removed and the amount of material to be removed.

Figure 4:
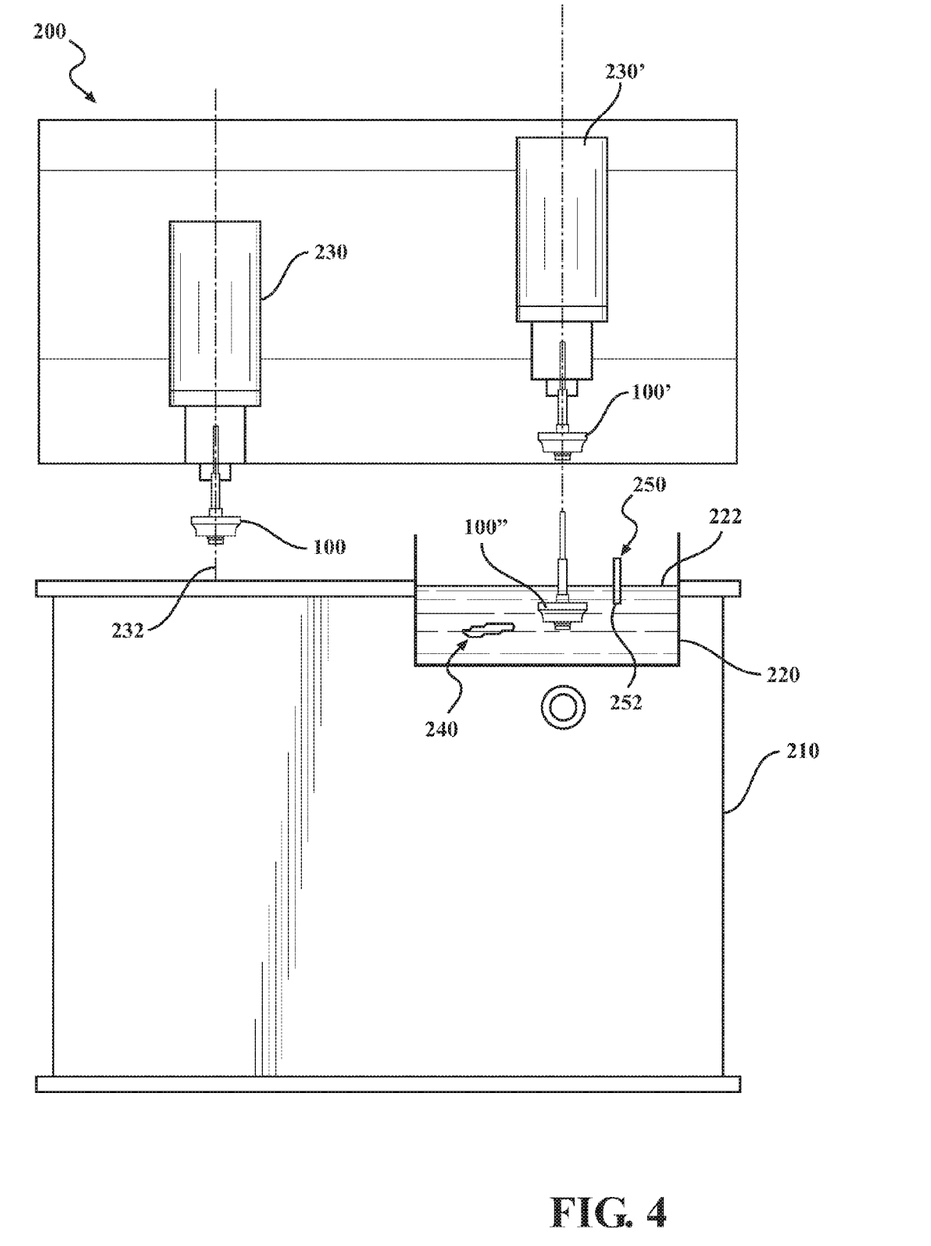
FIG. 4 is a front view of an unbalance correction machine according to a first example.

FIG. 4 shows an unbalance correction machine 200 according to a first example. In the illustrated example, the unbalance correction machine 200 includes a base 210 and a cutting tank 220. The cutting tank 220 can be defined in or supported by the base 210. The cutting tank 220 is the portion of the unbalance correction machine in which parts to be corrected are placed during the correction operation for machining. In some implementations, the cutting tank 220 is filled with a fluid to define a fluid level 222 within the basin, and the correction operation occurs while the part being corrected is disposed within the cutting tank 220 below the fluid level 222 such that it is submerged in the fluid. In other implementations, the part being corrected is not submerged during the correction operation.

The unbalance correction machine 200 includes a part manipulator 230 that is able to pick up the assembly 100 and move it to a desired position. In the illustrated example, the part manipulator 230 is moveable in three axes of motion, X (horizontal), Z (vertical) and A (rotary). As one example, the part manipulator 230 can include one or more motion control stages such as a linear X stage, a linear Z stage, and a rotating A stage, all of which are well known in the CNC machine art, and can include components such as stepper motors and linear or rotating bearings. As another example, the part manipulator 230 can be a robotic arm (i.e. an articulated robot with equivalent degrees of freedom).

Movement of the part manipulator 230 can be caused by a controller (not shown), such as a computing device that includes a processor that is operable to execute instructions stored in a computer memory. The controller can be operable to receive information, such as from the unbalance measuring machine, that indicates an unbalance characteristic or describes a correction operation determined based on measurement of an unbalance characteristic for the assembly 100.

The assembly 100 can be grasped by the part manipulator 230 such that the nose portion 122 of the turbine wheel 110 is oriented downward and the shaft 150 of the assembly 100 is oriented upward. As an example, the assembly 100 can be loaded into the part manipulator 230 by placing the shaft 150 in a part holder (not shown) such as a chuck, that is rotatable in the A direction to allow the part manipulator 230 to rotate the assembly 100 on the axis of rotation 102. The assembly 100 can be loaded by an operator or by a robot. In one implementation, a robot unloads the assembly 100 from the unbalance measuring machine and loads the assembly 100 into the unbalance correction machine 200. In another implementation, the robot transfers the assembly 100 from the unbalance measuring machine to a holding area, such as a load nest 232, and the part manipulator 230 picks up and loads the assembly 100 from the holding area.

Once the assembly 100 is loaded, a correction operation can be performed by the unbalance correction machine 200, such as in response to receiving a start command generated in response to operator input. The correction cycle can be fully automatic once the assembly 100 is loaded and the cycle start command is given. The part manipulator 230 of the unbalance correction machine 200 transfers the assembly 100 from the load nest 232 (positions denoted by 230 and 100) to the area above the cutting tank 220 (positions denoted by 230' and 100'). The part manipulator 230 then moves downward in the Z direction to submerge the assembly 100 in the cutting tank 220 (position denoted by 230" and 100").

Figure 5:
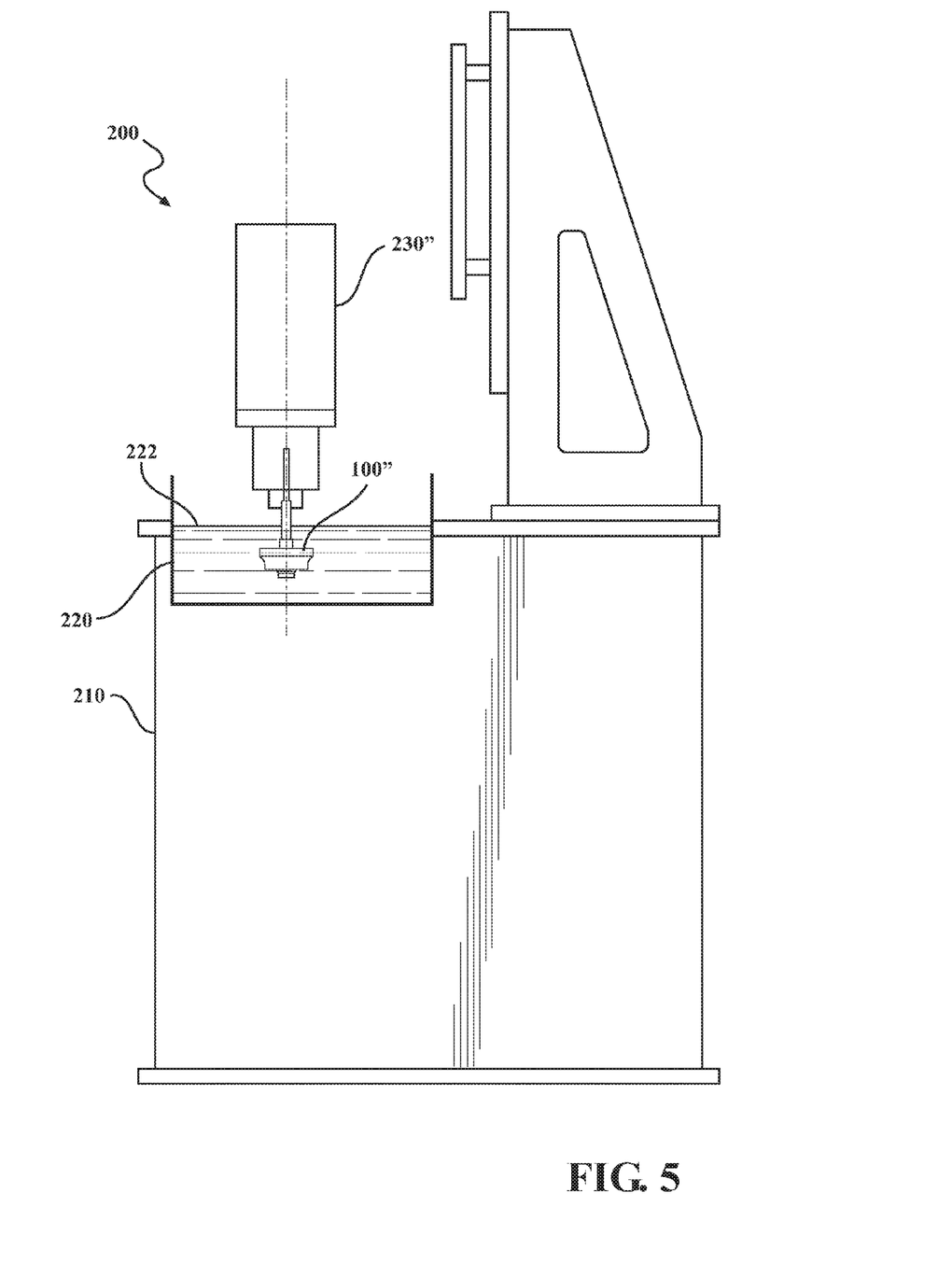
FIG. 5 is a side view of the unbalance correction machine according to the first example.

A nose correction water jet cutter 240 and a rear surface correction water jet cutter 250 are located in the cutting tank 220. A cutting nozzle 242 of the nose correction water jet cutter 240 and a cutting nozzle 252 of the rear surface correction water jet cutter 250 are each located below the fluid level 222 in the cutting tank 220. The nose correction water jet cutter 240 is oriented in a generally horizontal direction, with the cutting nozzle 242 operable to generate a cutting stream in a direction that is within 45 degrees of a plane that extends perpendicular to the axis of rotation 102 of the assembly 100. The rear surface correction water jet cutter 250 is oriented in a generally vertical direction, with the cutting nozzle 252 operable to generate a cutting stream in a direction that is within 45 degrees of the axis of rotation 102 of the assembly 100, and can be oriented downward.

Once the assembly 100 is submerged in the cutting tank 220, two correction operations are performed. Each of the two correction operations includes removing material from the assembly 100 in order to reduce or eliminate the unbalance condition. The first correction operation is performed with the cutting nozzle 242 of the nose correction water jet cutter 240 oriented so that the cutting stream extends in a first correction direction. The second correction operation is performed with the cutting nozzle 252 of the rear surface correction water jet cutter 250 oriented so that the cutting stream extends in a second correction direction. The first correction direction is aligned so as to remove material in order to correct unbalance of the assembly 100 in a first correction plane. The second correction direction is aligned so as to remove material in order to correct unbalance of the assembly 100 in a second correction plane. In some implementations, the correction operations are performed in series, in any order. In certain other implementations, the two correction operations are performed simultaneously. In addition, the terms first and second imply no particular order for the correction operations, and do not necessarily identify the type or location of the correction being made. Thus, both "first" and "second" could be used to describe corrections made to the nose portion 122 or the rear surface 126 of the assembly 100 in any order.

In the first correction operation, the assembly 100 is disposed in the cutting tank 220 such that the nose portion 122 of the assembly 100 is oriented downward. The part manipulator 230 moves in the X and Z directions to align the nose portion 122 of the assembly 100 with the cutting nozzle 242. The controller of the unbalance correction machine 200 then initiates cutting using the cutting nozzle 242 to remove material from the assembly 100 in a first correction area 123 that is located on the nose portion 122 of the turbine wheel 110. While the cutting nozzle 242 is active, the part manipulator 230 rotates the assembly 100 in the A direction from a first rotational position to a second rotational position. Upon reaching the second rotational position, the nose correction water jet cutter 240 can be deactivated, or additional cycles of movement between the first and second rotational positions can be performed to remove additional material from the first correction area 123. The amount of material removed from the first correction area 123 is a function of parameters for the first correction operation, such as the distance between the first rotational position and the second rotational position, the rotational speed of motion in the A direction, and the operating parameters of the nose correction water jet cutter 240. The parameters for the first correction operation are determined from the measurements performed by the unbalance measuring machine. The operating parameters of the nose correction water jet cutter 240 can include, for example, water pressure, abrasive type, abrasive size, abrasive amount, and nozzle geometry.

It will be understood that the foregoing description performs a correction operation by defining a pocket cut in the nose portion 122. As an alternative, an equivalent correction can be performed by either a pocket or a through cut by first orienting the assembly 100 in the A direction as per parameters determined for the correction operation and the moving the assembly in the X and Z directions without changing the orientation of the assembly 100 in the A direction.

In the second correction operation, the assembly 100 is disposed in the cutting tank 220 such that the nose portion 122 of the assembly 100 is oriented downward. The second correction operation can occur before, after, or under certain circumstances during the first correction operation. The part manipulator 230 moves in the X and Z directions to align the rear surface 126 of the of the turbine wheel 110 of the assembly 100 with the cutting nozzle 252. Since the cutting nozzle 252 is oriented downward, the rear surface 126 is oriented upward and is facing the cutting nozzle 252. The controller of the unbalance correction machine 200 then initiates cutting using the cutting nozzle 252 to remove material from the assembly 100 in a second correction area 127 that is located on the rear surface 126 of the turbine wheel 110. While the cutting nozzle 252 is active, the part manipulator 230 rotates the assembly 100 in the A direction from a first rotational position to a second rotational position (which can be independent of the positions used in the first correction operation). Upon reaching the second rotational position, the rear surface correction water jet cutter 250 can be deactivated, or additional cycles of movement between the first and second rotational positions can be performed to remove additional material from the second correction area 127. The amount of material removed from the second correction area 127 is a function of the same parameters listed for the first correction operation, such as the distance between the first rotational position and the second rotational position, the rotational speed of motion in the A direction, and the operating parameters of the rear surface correction water jet cutter 250. The parameters for the second correction operation are determined from the measurements performed by the unbalance measuring machine. The operating parameters of the rear surface correction water jet cutter 250 can include, for example, water pressure, abrasive type, abrasive size, abrasive amount, and nozzle geometry.

When the first and second correction operations are completed, the assembly 100 is withdrawn from the cutting tank 220, rinsed, blown off and placed in an unload nest (not shown).

Correction cut width and depth will vary with part design. It is anticipated that the cutting nozzle 242 and the cutting nozzle 252 will be custom configured for various cut geometries. Typically, the cut made in the second removal operation is a pocket cut or a plunge cut into the rear surface 126 with, for example, the following characteristics: material removal up to 450 mm3; max depth from 0.2 mm to 2 mm; radial width of cut from 4 mm to 10 mm; maximum arc of cut of 120 degrees; and no sharp edges in the cut, with a minimum radius allowed of approximately 1 mm.

The nose correction can be implemented as a pocket cut to take advantage of the more uniform material removal rate provided by water jet cutting, which eliminates the need for precise knowledge of surface geometry of the nose portion. The nose correction cut made in the first correction area 123 can have, for example, the following characteristics: material removal up to 450 mm3; maximum depth ranging from 1 mm to 5 mm; axial length of cut ranging from 4 mm to 15 mm; and no sharp edges in the cut with a minimum radius of approximately 1 mm. Alternatively, the nose cut made in the first correction operation may be implemented as a through cut. The through cut may be adjacent to or may extend through the hex nut defined on the nose portion. A minimum distance from the axis of rotation 102 and a maximum distance from nose end can be specified.

Although the first and second correction operations are described as each being performed with a single dedicated cutting nozzle, each operation could instead be performed using multiple cutting nozzles at once or, alternatively, by a single multi-purpose nozzle.

Figure 6:
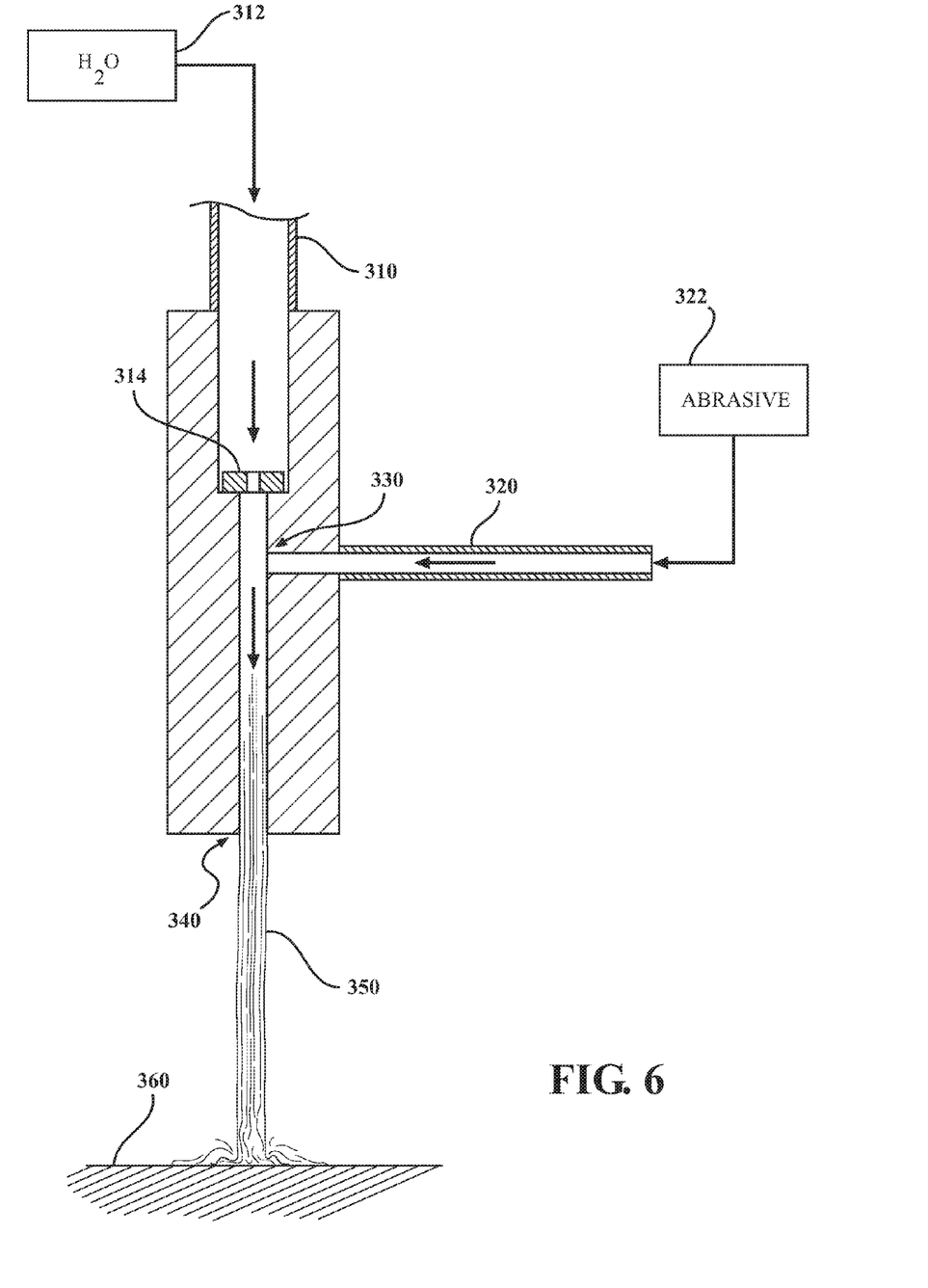
FIG. 6 is a cross-section showing a conventional abrasive water jet cutter.

FIG. 6 is an illustration showing a water jet cutter 300. The water jet cutter 300 is conventional and can be used as the nose correction water jet cutter 240 and/or as the rear surface correction water jet cutter 250. The water jet cutter 300 includes a water inlet 310 at which high pressure water enters from a water source 312. The high pressure water passes through an orifice 314, which is typically a disk shaped element made from a high strength material (e.g. synthetic corundum) having a small diameter bore defined through it that controls the flow rate of the high pressure water and shapes the stream. After the high pressure water passes through the orifice 314, an abrasive material is mixed with the high pressure-water. Although different abrasive materials can be utilized, garnet is an example of a suitable abrasive material. The abrasive material is supplied to an abrasive inlet 320 of the water jet cutter 300 from an abrasive source 322. The abrasive material mixes with the water inside the water jet cutter at a junction 330. The mixed water and abrasive material then exit the water jet cutter 300 at a nozzle 340 to define a cutting stream 350 that is operable to cut material 360.

Figure 7:
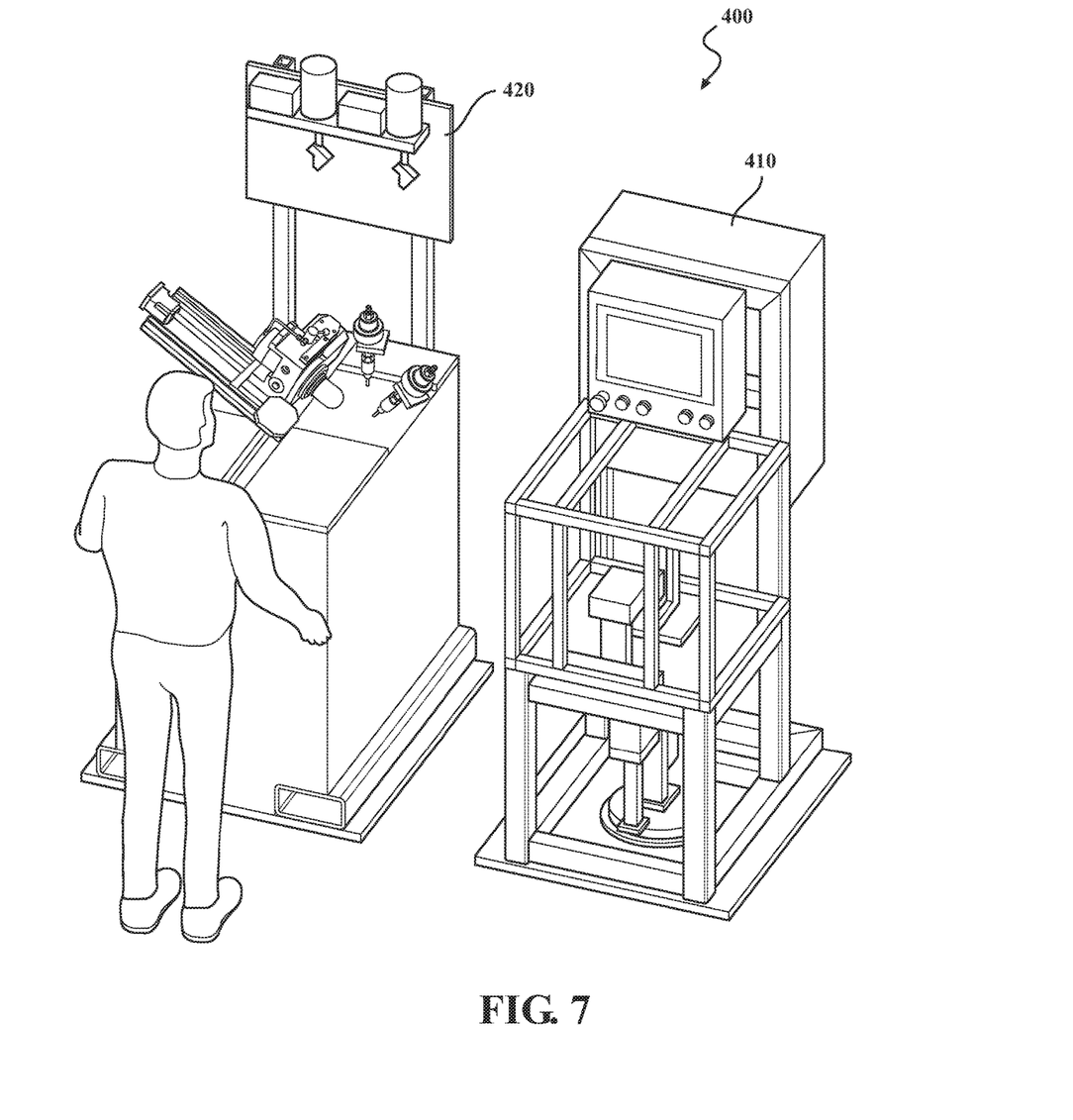
FIG. 7 is a perspective view showing a system for measuring and correcting unbalance.

FIG. 7 is a perspective view showing a system 400 for measuring and correcting unbalance. The system 400 includes an unbalance measurement machine 410 and an unbalance correction machine 420.

The unbalance measurement machine 410 is operable to measure an unbalance condition of a part to be corrected, such as the assembly 100. The unbalance condition of the part to be corrected may be described, for example, in terms of a magnitude of the unbalance condition and a phase of the unbalance condition. The measurement of the unbalance condition may be expressed in other forms as long as the information output by the unbalance measurement machine 410 may be used to correct (i.e. reduce and/or eliminate) the unbalance condition of the part to be corrected.

Generally, the unbalance measurement machine 410 includes a mechanism that holds and rotates the assembly 100, while measuring forces and/or motion resulting from rotation of the assembly 100. In one implementation, the unbalance measurement machine 410 is a hard-bearing balancer that includes a sensor or sensors that measure forces acting on the suspension of the balancer during rotation of the assembly 100. In another implementation, the unbalance measurement machine 410 is a soft-bearing balancer that includes a sensor or sensors that measure motion of the suspension of the balancer during rotation of the assembly 100. An angular position of the assembly 100 may be measured by a device that generates an index pulse or by an angle sensor.

Figure 8:
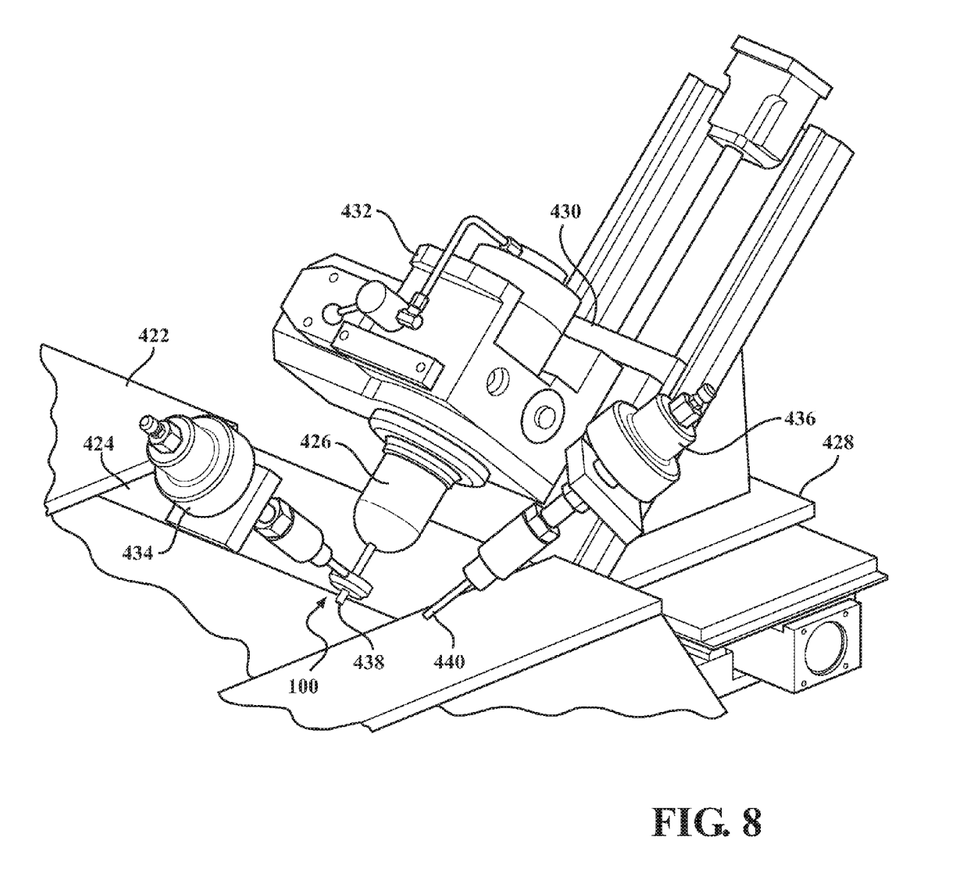
FIG. 8 is a perspective view showing an unbalance correction machine according to a second example.
Figure 9:
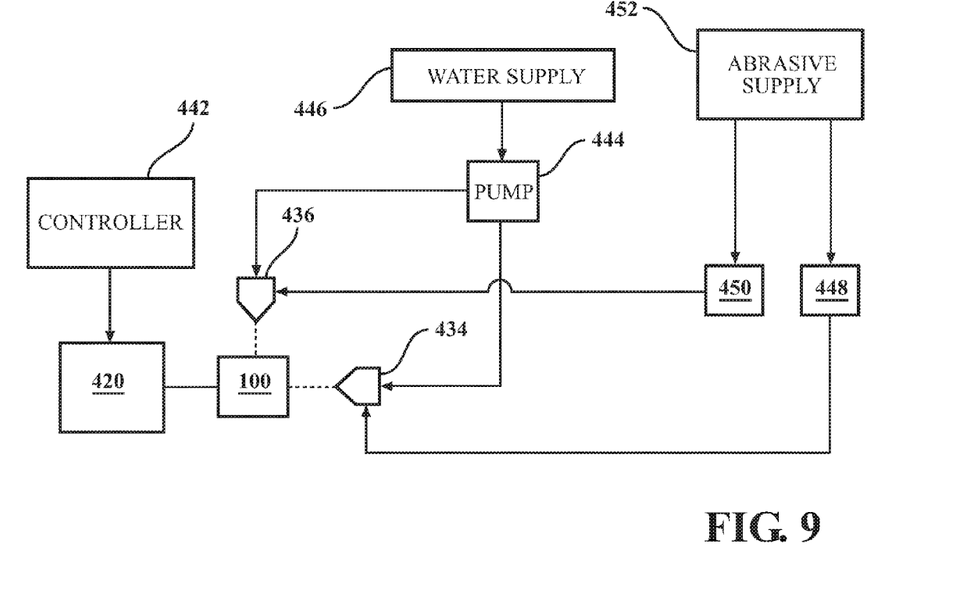
FIG. 9 is a block diagram showing the unbalance correction machine according to the second example.

FIGS. 8-9 show the unbalance correction machine 420. The unbalance correction machine 420 is operable to remove mass from a part to be corrected, such as the assembly 100, based on the magnitude and phase of the unbalance condition, as determined by the unbalance measurement machine 410. In the illustrated example, the unbalance correction machine 420 includes a base 422 and a cutting tank 424. The cutting tank 424 can be defined in or supported by the base 422. The cutting tank 424 is the portion of the unbalance correction machine 420 in which the assembly 100 is placed during the correction operation for machining. In some implementations, the cutting tank 424 is filled with a fluid to define a fluid level within the cutting tank 424, and the correction operation occurs while the assembly 100 is disposed within the cutting tank 424 below the fluid level such that it is submerged in the fluid. In other implementations, the assembly 100 is not submerged during the correction operation.

The unbalance correction machine 420 includes a part manipulator 426 that is able to hold the assembly 100 and move it to a desired position. As an example, the part manipulator 426 may include a mechanical coupler that firmly engages and holds the assembly 100, such as a collet or chuck.

The part manipulator 426 is moveable in one or more axes of motion. As one example, the part manipulator 426 can include one or more motion control stages a linear X stage 428, a linear Z stage 430, and a rotating A stage 432, all of which are well known in the CNC machine art, and can include components such as stepper motors and linear or rotating bearings. As another example, the part manipulator 426 can be a robotic arm (i.e. an articulated robot with equivalent degrees of freedom).

Movement of the part manipulator 426 can be caused by a controller 442, such as a computing device that includes a processor that is operable to execute instructions stored in a memory. The controller 442 can be operable to receive information, such as from the unbalance measurement machine 410 or from an input device used by an operator, that indicates an unbalance characteristic (e.g. magnitude and phase) or describes a correction operation determined based on an unbalance characteristic for the assembly 100.

The assembly 100 can be grasped by the part manipulator 426 such that the nose portion 122 of the turbine wheel 110 is oriented downward and the shaft 150 of the assembly 100 is oriented upward. As an example, the assembly 100 can be loaded into the part manipulator 426 by placing the shaft 150 in a part holder (not shown) such as a chuck, that is rotatable in the A direction to allow the part manipulator 426 to rotate the assembly 100 on the axis of rotation 102. The assembly 100 can be loaded by an operator or by a robot. In one implementation, a robot unloads the assembly 100 from the unbalance measurement machine 410 and loads the assembly 100 into the unbalance correction machine 420. In another implementation, the robot transfers the assembly 100 from the unbalance measurement machine 410 to a holding area, such as a load nest, and the part manipulator 426 picks up and loads the assembly 100 from the holding area into the part manipulator 426 of the unbalance correction machine 420. In another implementation, a human operator unloads the assembly 100 from the unbalance measurement machine 410 and loads the assembly 100 into the part manipulator 426 of the unbalance correction machine 420.

Once the assembly 100 is loaded, a correction operation can be performed by the unbalance correction machine 420. As one example, the correction can be performed in response to receiving a cycle start command generated in response to operator input. As another example, the correction operation can be initiated by the controller 442 issuing the cycle start command in response to determining that the assembly 100 is loaded. The correction cycle can be fully automatic once the assembly 100 is loaded and the cycle start command is given. The part manipulator 426 of the unbalance correction machine 420 positions the assembly 100 in the area above the cutting tank 424. The part manipulator 230 may then move downward in the Z direction to submerge the assembly 100 in the cutting tank 424.

The unbalance correction machine 420 includes a nose correction water jet cutter 434 and a rear surface correction water jet cutter 436 located in or above the cutting tank 424. The nose correction water jet cutter 434 and the rear surface correction water jet cutter 436 may each be configured in the manner described with respect to the water jet cutter 300. As best seen in FIG. 9, the nose correction water jet cutter 434 and the rear surface correction water jet cutter 436 each receive extremely high pressure water from a pump 444 that pressurizes low pressure water from a water supply 446. The nose correction water jet cutter 434 and the rear surface correction water jet cutter 436 each receive abrasive material from first and second abrasive metering devices 448, 450. The first and second abrasive metering devices 448, 450 are operable to deliver the abrasive material from an abrasive supply 452 to the nose correction water jet cutter 434 and the rear surface correction water jet cutter 436. The rate at which the first and second abrasive metering devices 448, 450 deliver the abrasive material to the nose correction water jet cutter 434 and the rear surface correction water jet cutter 436 may be controlled by the controller 442. In some implementations, the controller 442 causes supply of the abrasive material to the nose correction water jet cutter 434 and the rear surface correction water jet cutter 436 at a substantially constant rate. A substantially constant rate is a rate that is sufficiently constant to allow precision material removal that achieves a desired residual unbalance. As an example, a substantially constant rate may be within plus or minus five percent of a desired rate. In other implementations, the controller 442 causes supply of the abrasive material to the nose correction water jet cutter 434 and the rear surface correction water jet cutter 436 at a variable rate.

The nose correction water jet cutter 434 and a rear surface correction water jet cutter 436 are located in or above the cutting tank 424. A cutting nozzle 438 of the nose correction water jet cutter 434 and a cutting nozzle 440 of the rear surface correction water jet cutter 436 may each located below the fluid level in the cutting tank 424. The nose correction water jet cutter 434 is oriented in a direction that is generally perpendicular to the Z-direction of the unbalance correction machine 420, with the cutting nozzle 438 operable to generate a cutting stream in a direction that is within 45 degrees of a plane that extends perpendicular to the axis of rotation 102 of the assembly 100. The rear surface correction water jet cutter 436 is oriented such that it is able to direct a cutting stream toward the rear surface 126 of the assembly. For example, the rear surface correction water jet cutter 436 may be oriented to define a cutting direction for the cutting stream that is within 45 degrees of the Z-direction of the unbalance correction machine 420 and of the axis of rotation 102 of the assembly 100.

Once the assembly 100 is submerged in the cutting tank 424, two correction operations may be performed. Each of the two correction operations includes removing material from the assembly 100 in order to reduce or eliminate the unbalance condition. The two correction operations are performed in a first correction direction that is aligned to remove material in a first correction plane and a second correction direction that is aligned to remove material in a second correction plane, respectively. The first correction direction may be the direction in which a first cutting stream is produced by the cutting nozzle 438 of the nose correction water jet cutter 434 and the second correction direction may by the direction is which a second cutting stream is produced by the cutting nozzle 440 of the rear surface correction water jet cutter 436. In some implementations, the correction operations are performed in series, in any order. In certain other implementations, the two correction operations are performed simultaneously. In addition, the terms first and second imply no particular order for the correction operations, and do not necessarily identify the type or location of the correction being made. Thus, both "first" and "second" could be used to describe corrections made to the nose portion 122 or the rear surface 126 of the assembly 100 in any order.

In the first correction operation, the assembly 100 is disposed in the cutting tank 424 such that the nose portion 122 of the assembly 100 is oriented downward. The part manipulator 230 moves in the X and Z directions to align the nose portion 122 of the assembly 100 with the cutting nozzle 438. The controller 442 of the unbalance correction machine 200 then initiates cutting using the cutting nozzle 438 to remove material from the assembly 100 in a first correction area 123 that is located on the nose portion 122 of the turbine wheel 110. While the cutting nozzle 438 is active, one or more of the linear X stage 428, the linear Z stage 430, and the rotating A stage 432 are controlled such that they cause the part manipulator 426 to move the assembly 100 according to a cutting path. The cutting path for the first correction operation may be defined by a pattern of motion of the assembly 100 relative to the cutting nozzle 438 in which the angular orientation of the assembly 100 relative to the cutting nozzle 438 changes as a result of motion by the rotating A stage 432, in which an axial distance relative to the cutting nozzle 438 changes as a result of motion by the linear Z stage 430, and/or in which a longitudinal position of the cutting nozzle 438 changes with respect to the assembly 100 as a result of motion by the linear X stage 428.

The amount of material removed from the first correction area 123 is a function of parameters for the first correction operation. The parameters for the first correction operation are determined from the measurements performed by the unbalance measurement machine 410. Determining the parameters for the first correction operation may include determining how much mass to move from the assembly, determining where the mass should be removed from, determining a cutting path for removing the mass from the determined location, calculating the amount of abrasive material needed to remove the mass, and distributing the amount of abrasive material along the cutting path at a target rate.

In implementations where the first correction operation is performed by defining a pocket cut in the first correction area, the amount of material removed is proportional to the amount of abrasive material that impacts the assembly 100 during the correction operation. Factors that may affect the amount of material removed per unit (e.g. volume or mass) of the abrasive material include, for example, water pressure, abrasive type, abrasive size, nozzle geometry, and the type of material being cut (i.e. the material the assembly 100 is formed from). In implementations where the first correction operation is performed by defining a through cut in the first correction area, the amount of material removed is a function of the cutting path relative to the assembly 100 during the correction operation.

In the second correction operation, the assembly 100 is disposed in the cutting tank 220 such that the nose portion 122 of the assembly 100 is oriented downward. The second correction operation can occur before, after, or under certain circumstances during the first correction operation. The part manipulator 426 moves in the X and Z directions to align the rear surface 126 of the of the turbine wheel 110 of the assembly 100 with the cutting nozzle 440. Since the cutting nozzle 440 is oriented downward, the rear surface 126 is oriented upward and is facing the cutting nozzle 440. The controller 442 of the unbalance correction machine 420 then initiates cutting using the cutting nozzle 440 to remove material from the assembly 100 in a second correction area 127 that is located on the rear surface 126 of the turbine wheel 110. While the cutting nozzle 440 is active, the part manipulator 426 rotates the assembly 100 in the A direction and/or translates the assembly in the X direction according to a cutting path.

Figure 10:
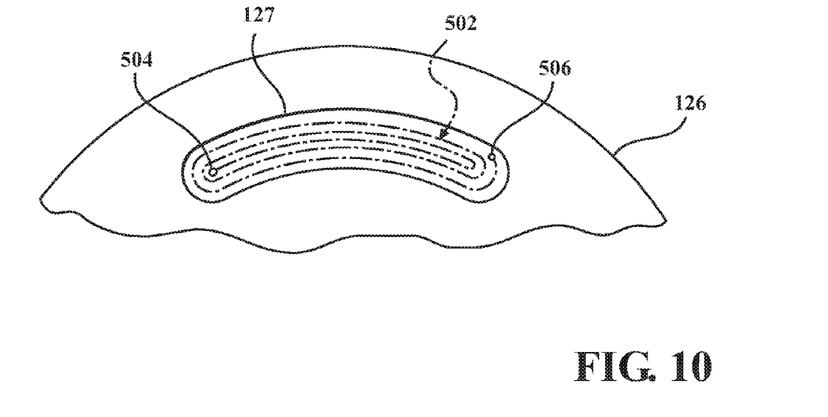
FIG. 10 is an illustration showing an example of a cutting path.

FIG. 10 shows an example of a cutting path 502 that can be utilized to form a pocket cut in the rear surface 126 of the assembly 100 in the second correction area. The cutting path 500 is defined as a line that extends between a first endpoint 504 and a second endpoint 506 with curved and/or straight sections. The cutting path 500 may be determined, such as by the controller 442, to cause removal of a desired amount of material from the second correction area 127. The cutting path 500 may be traversed in any desired direction, such as from the first endpoint 504 to the second endpoint 506, or from the first endpoint 504 to the second endpoint 506. The shape of the cutting path 500 is not limited to the shape shown in the illustrated example. Instead, the shape of the cutting path 500 is determined, such as by the controller 442, using constraints that allow the unbalance correction machine 420 to control motion of the assembly 100 relative to the cutting nozzle 440 such that the amount of material removal throughout the second correction area 127 is substantially constant, without pitting or gouging. In particular, the controller 442 may determine the cutting path according to a minimum curvature radius, so that a substantially constant speed (e.g. inches per second along the cutting path 500) is maintained with respect to the cutting path 500, thereby avoiding pitting or gouging that may occur if the speed of the cutting nozzle 440 fluctuates relative to the cutting path 500, which may occur in the event of abrupt changes to the direction of motion of the cutting nozzle 440 relative to the assembly 100. By maintaining a substantially constant speed in combination with a substantially constant flow rate of the abrasive material, a uniform pocket cut depth can be achieved. In some implementations starting and/or stopping of motion along the cutting path 500, such as at the beginning and end of the cutting path 500, is accompanied by a taper in or taper out of the speed along the cutting path 500 and/or the flow rate of the abrasive material.

The amount of material removed from the second correction area 127 is a function of parameters for the second correction operation. Generally, the amount of material removed is proportional to the amount of abrasive material that impacts the assembly 100 during the correction operation, and other factors affect the amount of material removed per unit (e.g. volume or mass) of the abrasive material. These other factors include, for example, water pressure, abrasive type, abrasive size, nozzle geometry, and the type of material being cut (i.e. the material the assembly 100 is formed from).

The parameters for the second correction operation are determined from the measurements performed by the unbalance measurement machine 410. Determining the parameters for the second correction operation may include determining how much mass to move from the assembly, determining where the mass should be removed from, determining a cutting path for removing the mass from the determined location, calculating the amount of abrasive material needed to remove the mass, and distributing the amount of abrasive material along the cutting path at a target rate. The operating parameters of the rear surface correction water jet cutter 436 can include, for example, water pressure, abrasive type, abrasive size, abrasive amount, and nozzle geometry.

When the first and second correction operations are completed, the assembly 100 is withdrawn from the cutting tank 424, rinsed, blown off and placed in an unload nest (not shown).

Correction cut width and depth will vary with part design. It is anticipated that the cutting nozzle 438 and the cutting nozzle 440 will be custom configured for various cut geometries. Typically, the cut made in the second removal operation is a pocket cut or a plunge cut into the rear surface 126 with, for example, the following characteristics: material removal up to 450 mm3; max depth from 0.2 mm to 2 mm; radial width of cut from 4 mm to 10 mm; maximum arc of cut of 120 degrees; and no sharp edges in the cut, with a minimum radius allowed of approximately 1 mm.

The nose correction can be implemented as a pocket cut to take advantage of the more uniform material removal rate provided by water jet cutting, which eliminates the need for precise knowledge of surface geometry of the nose portion. The nose correction cut made in the first correction area 123 can have, for example, the following characteristics: material removal up to 450 mm3; maximum depth ranging from 1 mm to 5 mm; axial length of cut ranging from 4 mm to 15 mm; and no sharp edges in the cut with a minimum radius of approximately 1 mm. As one alternative, the nose cut made in the first correction operation may be implemented as a through cut across the side of the nose portion 122. The through cut may be adjacent to or may extend through the hex nut defined on the nose portion. A minimum distance from the axis of rotation 102 and a maximum distance from nose end can be specified. As another alternative, the nose cut made in the first correction operation may be in the shape of an open cylindrical or "U" shaped section.

Although the first and second correction operations are described as each being performed with a single dedicated cutting nozzle, each operation could instead be performed using multiple cutting nozzles at once or, alternatively, by a single multi-purpose nozzle.

It should be understood that the disclosure herein has been made in connection with an assembly including a turbine wheel and a shaft as an example of a workpiece, but can be applied to other workpieces. As examples, the methods, apparatuses, and systems described herein may be applied to other types of turbocharger components that may exhibit unbalance relative to an axis of rotation, or any other type of component, inclusive of components that are not related to turbochargers, that may exhibit unbalance around an axis of rotation.

Unless otherwise specified herein, qualifiers such as "generally," "substantially," or "approximately," indicate compliance with the noted property or characteristic subject to typical design and manufacturing tolerances and limitations.

While the disclosure has been made in connection with what is presently considered to be the most practical and preferred embodiment, it should be understood that the disclosure is intended to cover various modifications and equivalent arrangements.

The invention claimed is:

1. A method for correcting unbalance of a turbocharger component relative to an axis of rotation of the turbocharger component, comprising:
   determining one or more unbalance characteristics for the turbocharger component;
   determining parameters for a first correction operation to be performed in a first correction plane;
   moving the turbocharger component to align a first correction area of the turbocharger component with respect to a first water jet cutter, wherein the turbocharger component includes a turbine wheel having a rear surface, the first correction area is located on the rear surface, and moving the turbocharger component to align the first correction area of the turbocharger component with respect to the first water jet cutter includes motion in a first rotational direction around the axis of rotation of the turbocharger component; and
   performing the first correction operation using the first water jet cutter, wherein the first correction operation includes removing material from the rear surface of the turbocharger component by defining a pocket cut in the rear surface using the first water jet cutter.

2. The method of claim 1, wherein defining the pocket cut in the rear surface using the first water jet cutter is performed by moving the turbocharger component relative to the first water jet cutter in the first rotational direction and at least a first linear direction along a cutting path at a substantially constant speed with respect to the cutting path.

3. The method of claim 1, wherein defining the pocket cut in the rear surface using the first water jet cutter includes controlling the first water jet cutter to produce a cutting stream that includes water and an abrasive material, and the cutting stream has a substantially constant flow rate for the abrasive material.

4. The method of claim 1, wherein the rear surface lies in a plane that extends perpendicular to the axis of rotation.

5. A method for correcting unbalance of a turbine wheel and shaft assembly for a turbocharger relative to an axis of rotation of the turbine wheel and shaft component prior to assembly of the turbine wheel and shaft assembly relative to a turbocharger housing, the method comprising:
    determining one or more unbalance characteristics for the turbine wheel and shaft assembly;
    determining parameters for a first correction operation to be performed in a first correction plane;
    loading the turbine wheel and shaft assembly into a part manipulator;
    moving the turbine wheel and shaft assembly using the part manipulator to align a first correction area of the turbocharger component with respect to a first water jet cutter;
    performing the first correction operation using the first water jet cutter while the moving the turbine wheel and shaft assembly relative to the first water jet cutter according to a first cutting path using the part manipulator;
    determining parameters for a second correction operation to be performed in a second correction plane;
    moving the turbine wheel and shaft assembly to align a second correction area of the turbine wheel and shaft assembly with respect to a second water jet cutter; and
    performing the second correction operation using the second water jet cutter while the moving the turbine wheel and shaft assembly relative to the second water jet cutter according to a second cutting path using the part manipulator.

6. The method of claim 5, wherein moving the turbine wheel and shaft assembly to align the second correction area of the turbine wheel and shaft assembly with respect to the second water jet cutter includes movement of the turbine wheel and shaft assembly in a first rotational direction around the axis of rotation of the turbocharger component.

7. The method of claim 5, wherein the turbine wheel and shaft assembly includes a nose portion, and the second correction area is located on the nose portion.

8. The method of claim 7, wherein the second correction operation includes removing material from the nose portion of the turbine wheel and shaft assembly by defining a pocket cut in the nose portion using the second water jet cutter.

9. The method of claim 7, wherein the second correction operation includes removing material from the nose portion of the turbine wheel and shaft assembly by defining a through cut in the nose portion using the second water jet cutter.

10. The method of claim 5, further comprising:
    submerging the turbine wheel and shaft assembly in a cutting tank prior to performing the first correction operation.

11. The method of claim 10, further comprising:
    removing the turbine wheel and shaft assembly from the cutting tank subsequent to performing the second correction operation.

12. A system for measuring and correcting unbalance of a turbine wheel and shaft assembly for a turbocharger that has an axis of rotation prior to assembly of the turbine wheel and shaft assembly relative to a turbocharger housing, the system comprising:
    an unbalance measurement machine operable to determine an unbalance characteristic of the turbine wheel and shaft assembly; and
    an unbalance correction machine that has a first water jet cutter that removes material from a first correction area of the turbine wheel and shaft assembly to correct the unbalance characteristic with a first cutting stream that is controlled to form a pocket cut in the first correction area, wherein:
        the first cutting stream includes water and an abrasive material and the first cutting stream has a substantially constant flow rate for the abrasive material,
        the unbalance correction machine includes a part manipulator that is operable to hold the turbine wheel and shaft assembly and one or more motion control stages that are operable to move the turbine wheel and shaft assembly relative to the first water jet cutter along a cutting path, and
        the one or more motion control stages cause the turbine wheel and shaft assembly to move relative to the first water jet cutter at a substantially constant speed with respect to the cutting path.

13. The system of claim 12, wherein the unbalance correction machine has a second water jet cutter that removes material from a second correction area of the turbine wheel and shaft assembly to correct the unbalance characteristic with a second cutting stream.

14. The system of claim 13, wherein the second water jet cutter that is controlled to form at least one of a pocket cut or a through cut in the second correction area.

* * * * *